United States Patent [19]

BeVier et al.

[11] Patent Number: 4,800,027

[45] Date of Patent: Jan. 24, 1989

[54] PROCESS FOR CONTINUOUS APPLICATION OF SOLID LUBRICANT TO MOVING BED PARTICLES

[75] Inventors: William E. BeVier, Kenmore; Charles F. Fails, deceased, late of Tonawanda, both of N.Y.; by Virginia N. Fails, executor, Seminole, Fla.

[73] Assignee: UOP, DesPlains, Ill.

[21] Appl. No.: 7,089

[22] Filed: Jan. 27, 1987

[51] Int. Cl.$^4$ .................. C10M 125/02; C10M 125/00
[52] U.S. Cl. .......................... 252/18; 252/22; 252/25; 252/27; 252/29; 502/60; 502/62
[58] Field of Search .................... 252/18, 22, 25, 27, 252/29; 502/60, 62

[56] References Cited

U.S. PATENT DOCUMENTS

| | | | |
|---|---|---|---|
| 2,622,937 | 12/1952 | Taylor | 302/64 |
| 3,756,925 | 9/1973 | Takeuchi et al. | 204/16 |
| 4,055,503 | 10/1977 | Anselment et al. | 252/29 |
| 4,080,233 | 3/1978 | McCloskey et al. | 156/212 |
| 4,200,541 | 4/1980 | Kinner et al. | 252/12.2 |
| 4,225,531 | 9/1980 | Jones et al. | 260/449.6 |
| 4,457,788 | 7/1984 | Staffin et al. | 148/30 |
| 4,511,375 | 4/1985 | BeVier | 55/28 |
| 4,526,877 | 7/1985 | Acharya et al. | 502/60 |

Primary Examiner—Jacqueline V. Howard
Attorney, Agent, or Firm—Richard G. Miller

[57] ABSTRACT

An apparatus and process for producing attrition-resistant moving bed particles with improved efficiency.

10 Claims, 1 Drawing Sheet

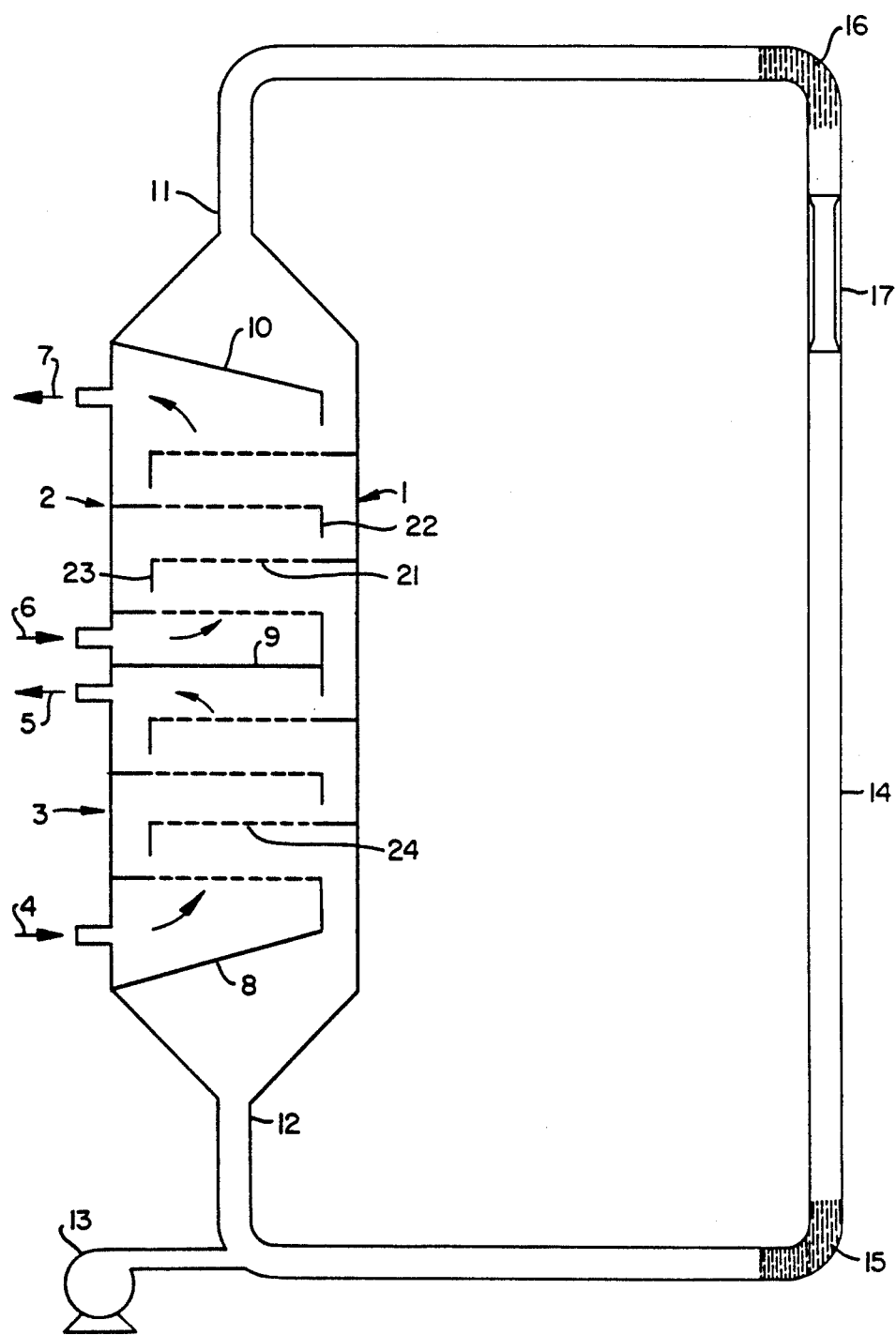

PROCESS FOR CONTINUOUS APPLICATION OF SOLID LUBRICANT TO MOVING BED PARTICLES

TECHNICAL FIELD

This invention relates generally to moving beds and is an improvement whereby moving beds operate with increased efficiency.

BACKGROUND ART

An often used procedure for the chemical or physical alteration of material involves the passage of such material through a bed of adsorbent, catalyst, etc. depending on the intended result. When a continuous process is employed, a packed bed presents certain problems. While it is desired to have short cycle times in order to minimize bed inventory and equipment size, longer cycle times are generally more energy efficient. Furthermore, there is a need for an elaborate and expensive valve assembly for cycling various streams among various beds, which can lead to increased maintenance costs. These operating problems become more acute as one tries to minimize capital expense by reducing cycle times. Those skilled in the art have long recognized the advantages of moving and fluidized beds over packed beds. Such advantages include a greater energy efficiency because of the reduction of cyclic and transient energy losses.

A problem with the use of certain particles in moving beds is attrition of the particle by abrasion of its surface. In fixed beds, fluid flow may cause adjacent particles to contact and abrade each other, especially when a localized portion or the entire bed is accidentally fluidized. Movement may also be caused by external forces such as vibrations due to a nearby compressor or location of the bed on a moving vehicle. However, in moving and fluidized beds the problem of attrition is greatly magnified. Excessive particle attrition is caused, for example, by abrasion among bed particles, abrasion with bed walls and bed internals and distributor jet impingement, and abrasion in circulation conduits to and from the bed. High particle attrition contributes to product contamination, particle loss, plugging of downstream equipment, high filtration costs, and unstable fluidization behavior such as channeling, slugging or increased entrainment.

The problem of particle attrition is especially severe with high porosity bed particles such as molecular sieves. Molecular sieve beads or pellets consist essentially of zeolite crystals and a clay binder material. Due to the ceramic nature of both these materials, the surface is highly abrasive and subject to attrition. The amount of surface attrition caused by an impact on the particle depends on the particle's momentum, which is the product of its mass and its velocity. Therefore, smaller particles traveling at low speeds, i.e. in a bed having low fluidization velocity, do not suffer as much attrition as large, highly fluidized particles. The total amount of attrition, as measured by the amount of dust generated in the moving bed, includes surface attrition and attrition due to the breaking up of the entire particle.

It has been possible to employ molecular sieves in fixed beds without excessive attrition. However, it has not generally been economical to use molecular sieves for moving beds, except in very specialized applications such as cracking petroleum fractions for gasoline. In this approach, very small molecular sieve particles made up of about 80% clay binder are formed. Molecular sieves employed in packed beds generally have only about 20% clay. The particles containing mostly clay have a higher crush strength, but a lower mass transfer efficiency, than the conventional friable molecular sieve particles. In catalytic cracking, the granular type particles are swept along by a carrier gas with which they react. The attrition experienced is somewhat less than that of particles containing 20% clay, and is nearly equal to the amount of sieve that must be replaced anyway due to loss of reactivity, so the attrition does not prevent the use of these particles in a moving bed. The slight reduction in total attrition is belived to be largely attributable to fewer particles becoming pulverized, as opposed to any significant difference in surface attrition of the "harder" particles.

Thus, the capability to employ friable molecular sieves in moving and fluidized beds while keeping attrition low without a significant reduction in efficiency would be highly desirable.

Another problem in the operation of moving and fluidized beds is the need for efficient movement of the bed particles relative to one another and also relative to the stationary bed apparatus. As a general rule, the greater the flowability of the bed particles, i.e. their ease of motion through the bed system, the greater is the efficiency of the bed process, be it a chemical reaction, a physical change such as adsorption, or merely a transport of mass.

A recent significant breakthrough in this field has been the development of an attrition resistant molecular sieve particle which exhibits increased attrition resistance when employed in a moving bed without a significant decrease in activity. This attrition resistant molecular sieve particle also enables the moving bed to be operated with improved efficiency due to greater bed particle flowability. This attrition resistant molecular sieve particle and the method of making it are disclosed and claimed in U.S. Pat. No. 4,526,877—Acharya et al.

U.S. Pat. No. 4,526,877 discloses three methods of making the attrition resistant molecular sieve particles. One method involves rolling sieve particles in a drum or other roll mill means containing solid lubricant, preferably in powder form. A second method involves mixing molecular sieve particles with solid lubricant-supplying pellets in a moving bed and operating the bed. A third method involves spraying molecular sieve particles with a liquid suspension of solid lubricant and subsequently drying the particles.

While all of these methods are effective, each method has disadvantages. The rolling mill method has the major disadvantage of either requiring a temporary halt to the moving bed process while the bed particles pass through the rolling mill operation, requiring an excessively large particle inventory in order to enable continuous operation of the moving bed or requiring the coating of the particles with more than the minimum coating so that the particles need not be as frequently removed from the bed for recoating. The solid lubricant-supplying pellet method has several disadvantages. It is generally very difficult to match the physical characteristics, such as size, density, shape, etc., of the pellet to the moving bed particle. The presence of solid lubricant-supplying pellets and moving bed particles having dissimilar physical characteristics in the same moving bed system could result in unstable and/or unpredictable moving bed behavior. Furthermore, the solid lubricant-supplying pellet may not be compatible under moving bed particle regeneration conditions such as high temperature. The liquid suspension method has the disadvantages of requiring a relatively long time and complicated procedures to be effective, and may not be useable where the liquid impairs the structural or mass transfer efficiency of the moving bed particles.

It is therefore an object of this invention to provide an improved moving bed apparatus and process.

It is another object of this invention to provide an improved moving bed apparatus and process wherein the moving bed particles are rendered more resistant to attrition without the need for applying solid lubricant to the particles in a separate rolling mill.

It is a further object of this invention to provide an improved moving bed apparatus and process wherein the moving bed particles are rendered more resistant to attrition without the need for employing solid lubricant-supplying pellets in the moving bed system.

It is yet another object of this invention to provide an improved moving bed apparatus and process wherein the moving bed particles are rendered more resistant to attrition without the need of applying a liquid suspension of solid lubricant to the particles.

It is a still further object of this invention to provide an improved moving bed apparatus and process wherein the moving bed particles move within and throughout the moving bed system with improved flowability.

SUMMARY OF THE INVENTION

The above and other objects which will become apparent to one skilled in the art upon a reading of this disclosure are attained by the present invention, one aspect of which comprises:

An apparatus comprising an enclosure having an inlet and an outlet, conduit means between the inlet and the outlet so as to place the inlet and outlet in flow communication, and solid lubricant comprising at least some of the internal surface of said conduit means, whereby recirculating particles passing out from the enclosure through the outlet, through the conduit means, and back into the enclosure through the inlet, contact the solid lubricant and attain solid lubricant on their surface.

Another aspect of this invention comprises:

A process for applying solid lubricant to moving bed particles comprising recirculating moving bed particles through a moving bed apparatus having an enclosure, enclosure outlet and inlet, and conduit means between the inlet and outlet so as to place the inlet and outlet in flow communication, and contacting recirculating moving particles with solid lubricant comprising at least some of the internal surface of said conduit means, thereby applying solid lubricant to the surface of said recirculating moving bed particles.

As used herein, the term "moving bed" means a system whereby dual component (such as gas and particle) contact is attained for reactive, transport, or exchange purposes while both components have spacial motion relative to the vessel containing them.

As used herein, the term "fluidized bed" means a moving bed in which the fluid drag force of the fluid component causes movement of the solid component from its repose position in a manner that enhances mixing of both components in the bed. The term, fluidized, is derived from the fluid-like characteristics, such as zero angle of repose, mobility, and a pressure head equal to the bulk density of the bed, which the bed assumes.

As used herein, the terms "projected surface" and "projected surface area" mean the smoothed out outer surface of a particle as it is apparent to the naked eye.

As used herein, the terms "conduit" or "conduit means" mean any means by which particles pass through to get from the moving bed outlet to the moving bed inlet, and is not limited solely to piping.

BRIEF DESCRIPTION OF THE DRAWING

The FIGURE is a simplified cross-sectional representation of one embodiment of the apparatus of this invention which may be used to carry out the process of this invention.

DETAILED DESCRIPTION

This invention is a moving bed apparatus and process whereby moving bed particles are rendered more attrition resistant and capable of greater flowability by the continuous application of solid lubricant to moving bed particles in an efficient and uncomplicated manner.

The moving bed apparatus and process of this invention may be used in conjunction with a large number of processes wherein material is chemically or physically altered by passage through an adsorbent bed, such as in adsorption and catalysis. Such processes also include drying, bulk separation of gases, vapors or liquids, and gas or liquid purification. Specific examples of such applications include fluidized catalytic cracking of oil to produce gasoline, removing carbon dioxide from air, removing water from compressed air, increasing the percentage of hydrogen in a waste stream, isomer separation, removing hydrocarbon solvents from air exhausted from paint booths or dry cleaning booths, bulk removal of reactants from plant streams with subsequent recycle, removal of trace contaminants from chemical plant vent streams, and producing oxygen by separating it from nitrogen in air.

Preferably molecular sieve particles are used in the process and with the apparatus of this invention. Molecular sieves are known in the art by various names such as crystalline aluminosilicates and crystalline zeolites; they generally refer to a class of hydrated metal aluminosilicates having a crystalline structure composed of an assembly of silicon and aluminum atoms yielding a precisely defined pore structure. The basic formula for crystalline zeolites may be represented as follows:

$$M_{2/n}O : Al_2O_3 : q\ SiO_2 : r\ H_2O$$

where "M" represents a metal cation, "n" its valence and q and r are coefficients. The various zeolites are distinguished by their silica-to-alumina ratio (i.e., the value of q) and by the exchangeable cation (M) present in the pore structure. Zeolites may be naturally occurring such as arionite, clinoptilolite, faujasite and mordenite or they may be man-made such as zeolite A, zeolite X and zeolite Y. Those skilled in the art are familiar with the specific chemical formula for these and the other known zeolites. Generally, synthetic molecular sieve crystals are commercially available in ultrafine powder form in a size range of from about 0.02 to 0.8 mil (0.5 to 20 microns). Molecular sieve particles useful in this invention may be prepared by pressing or extruding the molecular sieve crystals in powder form with a binder which is generally a clay material such as halloysite, dealkalized bentonite, ball clay and koalin as described in U.S. Pat. No. 3,219,590—Ribaud. Molecular sieve particles useful in this invention may also be prepared by the "in situ" crystallization or conversion of a preformed clay particle to zeolite material as described in Breck, D. W., *Zeolite Molecular Sieves*, John Wiley & Sons, New York, 1974, pages 725-755. Those skilled in the art may be aware of other methods to obtain molecular sieve particles. Molecular sieve particles useful in this invention may have any useful and effective particle size which, as is known to those in the art, will be determined in part by such parameters as the density of the particles, the fluidization medium and the desired fluidization conditions. Typically, particle sizes are less than about 0.25 inch (0.64 centimeter).

Molecular sieve particles particularly useful in this invention have a high porosity, i.e., possess an internal surface area greater than about 300 square meters per gram. The porosity of particles may be determined by a number of techniques known to those skilled in the art such as described in Gregg and Sing, *Adsorption Surface Area in Porosity*, Academic Press, 1967, New York, page 49 etc. or Young and Crowell, *Physical Adsorption of Gases*, Butterworth and Co., Ltd., 1962, Washington, page 182 etc. The micropores, those pores whose diameters are from about 1 to 1000 angstroms, provide the requisite area for activity such as adsorption or catalysis, while the macropores, generally those pores having diameters greater than about 1000 angstroms, ensure that there is sufficient surface porosity to provide a strong bond between the particle and solid lubricant. Typically, micropores having a diameter under about 20 angstroms may account for about 95 percent of the total internal surface area of a given sample of molecular sieve. High internal strength or crush strength of the molecular sieve particle is not directly related to its surface attrition resistance. Very hard molecular sieve particles, such as those employing a high binder content and/or structural fibers, are still susceptible to surface attrition upon particle to particle or particle to apparatus contact and would benefit from the practice of this invention.

The process and apparatus of this invention will be described in detail with reference to the FIGURE. The apparatus illustrated in the FIGURE is a counter current moving bed adsorption unit. The enclosure 1 includes an adsorption zone 2 wherein the adsorbent is used to clean or separate a gas stream and an adsorbent regeneration zone 3 wherein another gas stream is used to clean the recirculating adsorbent. The adsorbent enters the enclosure inlet 11 and passes downward over trays 21 each with an inlet downcomer 22 and outlet downcomer 23. The gas to be cleaned or separated enters at nozzle 6 and exits at nozzle 7. Baffle plates 9 and 10 are used to control the gas flow across the trays. The adsorbent passes across tray 24 and then exits via the enclosure outlet 12. The regeneration gas enters at nozzle 4 and exits at nozzle 5. Baffle plates 8 and 9 are used to control the gas flow across regeneration zone 3. The cleaned adsorbent particles exit at outlet 12 and are recirculated using blower 13 to supply a fluid stream for transport of the particles through conduit 14 back to enclosure inlet 11.

Conduit 14 has an internal surface characterized by distinct portions which are covered by solid lubricant. FIG. 1 illustrates two types of coated portions. One type, illustrated by shaded portions 15 and 16 is comprised of a mass or coating of solid lubricant which is applied to the inside surface of the conduit. Another type of coated portion is comprised of solid lubricant sleeve 17 which is inserted into conduit 14. Other types of coated portions comprise a conduit section constructed solely of solid lubricant, or a conduit section having solid lubricant imbedded in it during manufacture. It is preferred that the solid lubricant-covered portion or portions of the conduit be at places where particle velocity is high, such as at elbows, conduit contractions, or at impact screens.

As the moving bed particles recirculate through conduit 14 the particles pick up lubricant on their surface by contact with the internal surface of conduit 14. As the particles traverse the entire length of conduit 14 virtually all of the particles receive a thin surface coating of lubricant. This is because as particles contact the solid lubricant, those which pick up lubricant in excess of what is required for a thin coating, pass excess lubricant to other uncoated particles through interparticle contact. Furthermore, if the conduit is of a preferred embodiment, as is illustrated in the FIGURE wherein less than all of the conduit internal surface is covered by solid lubricant, excess lubricant on a particle may be passed off such particle to the portions of conduit internal surface not comprised of solid lubricant. When the moving bed particles are molecular sieve the solid lubricant generally is applied in an amount of from about $1.0 \times 10^{-7}$ to $2.0 \times 10^{-3}$ gram per square centimeter of particle projected surface area, preferably from about $1.0 \times 10^{-7}$ to $1.0 \times 10^{-7}$ to $3.0 \times 10^{-4}$ gram per square centimeter, most preferably from about $1.0 \times 10^{-7}$ to $3.0 \times 10^{-4}$ gram per square centimeter. Below about $1.0 \times 10^{-7}$ grams per square centimeter the lubricant may not be present in an amount to effectively reduce attrition, while above $2.0 \times 10^{-3}$ grams per square centimeter the lubricant may tend to impair the activity of the molecular sieve particle.

After passage through conduit 14, the solid lubricant-coated particles recirculated back into moving bed apparatus 1 through inlet 11. The process operates continuously enabling continuous recoating of the recirculating particles thus keeping the particles with an optimum or near optimum coating of solid lubricant. This enables the particles to continuously retain optimum or near optimum attrition resistance thus markedly increasing the life of the particles and hence the efficiency of the process. This also enables operation of the moving bed process continuously at optimum or near optimum flowability and thus serves to further enhance the efficiency of the moving bed process. The more efficient flowability of the moving bed particles also serves to improve the life of internal moving bed equipment such as seals and valves.

In another embodiment of the process and apparatus of this invention, a portion of the total bed particle flow is diverted through a passage which contains the solid lubricant. In that way only a portion of the particle flow needs to pass through conduit having a solid lubricant internal surface. Preferably the portion of the diverted flow bears a similar relationship to the total bed particle flow as the percentage of solid lubricant coating which is worn off of all bed particles during each circulation.

Among the many solid lubricants, useful in the process and apparatus of this invention one can name graphitic carbon powder, particulate graphite, molybdenum disulfide, polytetrafluoroethylene powder, tungsten disulfide, lead sulfide, titanium sulfide, molybdenum aluminum stearate, lead oxide, and the like, and suitable combinations thereof. Graphite is generally preferred because of availability and cost. It is believed that the hardness and crush strength of the solid lubricant coating is of considerable importance. A soft coating would probably wear out quickly and contribute additional powder formation while a coating which is very hard might not enable suitable transfer to the circulating particles. The preferred lubricant hardness is preferably comparable to that of beaded activated carbon.

Although this invention has been described in detail with reference to a particular embodiment, it can be appreciated that there are many other embodiments within the spirit and scope of the claims.

It is claimed:

1. A process for applying solid lubricant to moving bed particles comprising recirculating moving bed particles through a moving bed apparatus having an enclosure, enclosure outlet and inlet, and conduit means between the inlet and outlet so as to place the inlet and outlet in flow communication, and contacting recirculating moving bed particles with solid lubricant comprising at least some of the internal surface of said conduit means, thereby applying solid lubricant to the surface of said recirculating moving bed particles.

2. The process of claim 1 wherein said moving bed particles are molecular sieve adsorbent.

3. The process of claim 1 wherein said solid lubricant is graphite.

4. The process of claim 1 wherein said moving bed apparatus is operated countercurrently.

5. The process of claim 1 wherein said moving bed is operated as a fluidized bed.

6. The process of claim 1 wherein the solid lubricant has a hardness comparable to that of beaded activated carbon.

7. The process of claim 1 wherein the solid lubricant is molybdenum disulfide.

8. The process of claim 1 wherein the solid lubricant is polytetrafluoroethylene.

9. The process of claim 1 wherein not all of the particles employed in the moving bid apparatus are passed in contact with the solid lubricant, and the ratio of particles which are contacted with solid lubricant to the total amount of particles corresponds to about the percentage of solid lubricant coating which is worn off the total amount of particles.

10. The process of claim 1 wherein some solid lubricant which has been applied to recirculating particles is passed from the coated particles directly to other particles or to the conduit internal surface prior to the reentry of the coated particles into the moving bed apparatus.

* * * * *